(12) United States Patent
Henscheid et al.

(10) Patent No.: US 9,554,647 B2
(45) Date of Patent: Jan. 31, 2017

(54) CONNECTING DEVICE AND DRAWER HAVING A CONNECTING DEVICE

(71) Applicant: Grass GmbH, Hochst (AT)

(72) Inventors: Heinz-Josef Henscheid, Ruppichteroth (DE); Artur Hirtsiefer, Neunkirchen (DE); Bernd Rodder, Ruppichteroth (DE); Jurgen Schnell, Lohmar (DE); Klaus-Dieter Schmidt, Numbrecht (DE)

(73) Assignee: Grass GmbH, Hochst (AT)

( * ) Notice: Subject to any disclaimer, the term of this patent is extended or adjusted under 35 U.S.C. 154(b) by 0 days.

(21) Appl. No.: 13/688,612

(22) Filed: Nov. 29, 2012

(65) Prior Publication Data

US 2013/0154463 A1 Jun. 20, 2013

Related U.S. Application Data

(63) Continuation of application No. PCT/EP2011/002677, filed on May 31, 2011.

(30) Foreign Application Priority Data

May 31, 2010 (DE) .................... 20 2010 007 428 U

(51) Int. Cl.
*A47B 88/00* (2006.01)
*A47B 88/04* (2006.01)

(52) U.S. Cl.
CPC ....... *A47B 88/0014* (2013.01); *A47B 88/0422* (2013.01); *A47B 2088/0037* (2013.01); *Y10T 403/42* (2015.01)

(58) Field of Classification Search
CPC ............ A47B 88/0044; A47B 88/0051; A47B 88/0055

(Continued)

(56) References Cited

U.S. PATENT DOCUMENTS 861,911 A * 7/1907 Stewart .......................... 312/263
2,775,501 A * 12/1956 Kyllo .......................... 312/348.4

(Continued)

FOREIGN PATENT DOCUMENTS

DE 26 11 006 9/1977
DE 32 32 766 C1 3/1984

(Continued)

OTHER PUBLICATIONS

International Search Report dated Oct. 18, 2011 (with English translation).

*Primary Examiner* — Daniel J Troy
*Assistant Examiner* — Timothy M Ayres
(74) *Attorney, Agent, or Firm* — Burr & Brown, PLLC

(57) ABSTRACT

The invention proposes a device for connecting wall elements of a drawer, wherein the wall elements, in the connected state, form at least part of a wall of the drawer, and wherein the drawer wall comprises a front wall, a rear wall and/or at least one side wall. According to the invention, a plate-like connecting adapter with engagement means is provided for connecting the wall elements which are to be connected, the engagement means interacting, for connecting purposes, both with an end side of a first wall element which is to be connected and with a main side of a second wall element which is to be connected, wherein the connecting adapter, in its main direction of extent, butts against the end side and the main side.

18 Claims, 2 Drawing Sheets

(58) Field of Classification Search
    USPC .................... 312/348.4, 348.2, 265.5, 330.1,
                                              257.1, 312/263
    See application file for complete search history.

(56) References Cited

U.S. PATENT DOCUMENTS

| | | | | |
|---|---|---|---|---|
| 3,926,491 A * | 12/1975 | Greer | ......................... | 312/348.2 |
| 4,036,542 A * | 7/1977 | Courtwright | ............... | 312/348.2 |
| 4,108,520 A * | 8/1978 | Litchfield | ................. | 312/348.2 |
| 4,297,048 A * | 10/1981 | Jureit et al. | ................... | 403/189 |
| 4,712,942 A * | 12/1987 | Brown | ......................... | 403/174 |
| 5,213,403 A * | 5/1993 | Lautenschlager | .......... | 312/348.2 |
| 5,222,791 A * | 6/1993 | Held et al. | ................. | 312/348.4 |
| 5,364,181 A * | 11/1994 | Scheible | ..................... | 312/348.4 |
| 5,472,269 A * | 12/1995 | Novikoff | ....................... | 312/263 |
| 5,536,078 A * | 7/1996 | Novikoff | ....................... | 312/195 |
| 5,676,486 A * | 10/1997 | Keith | ............................ | 403/231 |
| 5,688,033 A * | 11/1997 | Fleisch et al. | .............. | 312/348.4 |
| 7,540,577 B2 * | 6/2009 | Netzer | ........................ | 312/348.4 |
| 7,857,404 B2 * | 12/2010 | Lam et al. | ................. | 312/348.2 |
| 8,162,420 B2 * | 4/2012 | Chen et al. | ................ | 312/348.4 |
| 8,215,730 B2 * | 7/2012 | Brown et al. | ................ | 312/402 |
| 2007/0138924 A1* | 6/2007 | Lautenschlager | .......... | 312/348.2 |
| 2010/0102692 A1* | 4/2010 | Hammerle | ................. | 312/348.4 |

FOREIGN PATENT DOCUMENTS

| | | |
|---|---|---|
| DE | 40 32 426 A1 | 4/1992 |
| EP | 0 654 234 A1 | 5/1995 |
| EP | 1 645 211 A2 | 4/2006 |
| EP | 1 932 448 B1 | 6/2008 |
| WO | 2009/006651 A2 | 1/2009 |

* cited by examiner

CONNECTING DEVICE AND DRAWER HAVING A CONNECTING DEVICE

CROSS REFERENCE TO RELATED APPLICATIONS

This application is a continuation of International Application No. PCT/EP2011/002677 filed May 31, 2011, which designated the United States, and claims the benefit under 35 USC §119(a)-(d) of German Application No. 20 2010 007 428.2 filed May 31, 2010, the entireties of which are incorporated herein by reference.

FIELD OF THE INVENTION

The invention relates to a connecting device and drawer having a connecting device.

BACKGROUND OF THE INVENTION

Different connecting devices are known in the furniture sector for assembling drawer-wall elements.

For example, straightforward adhesive-bonding connections or mortise and tenon joints are realized for drawer-wall elements made of wood.

The connected wall elements of a drawer form at least part of a wall of the drawer, wherein the drawer wall, depending on the position on the drawer, may comprise a front wall, a rear wall and usually two side walls.

SUMMARY OF THE INVENTION

It is an object of the present invention to provide a technically intelligent and cost-effective type of connection for drawers.

The invention proceeds from a device for connecting wall elements of a drawer, wherein the wall elements, in the connected state, form at least part of a wall of the drawer, and wherein the drawer wall comprises a front wall, a rear wall and/or at least one side wall. An essential aspect of the present invention is that a plate-like connecting adapter with engagement means is provided for connecting the wall elements which are to be connected, the engagement means interacting, for connecting purposes, both with an end side of a first wall element which is to be connected and with a main side of a second wall element which is to be connected, wherein the connecting adapter, in its main direction of extent, butts against the end side and the main side. This allows wall elements to be connected in a particularly space-saving and/or compact manner. Moreover, connection to the plate-like connecting adapter is extremely stable. This is because the flat, or basically plate-form, adjustment adapter may be comparatively stiff over its surface area. High connecting forces can be absorbed as a result of the surface-area abutment of the connecting adapter against the end side and the main side of the wall elements which are to be connected.

In the fixed state, the connecting adapter can have a stiffening effect in the wall-element portion covered by it. Moreover, a plate-like connecting adapter can be used to realize a multiplicity of connecting locations, which can be established in the form of points or lines or in planar fashion between the connecting adapter and portions of the wall elements which are to be connected. The adjustment adapter is preferably present in abutment against the end side of the one wall element and in abutment against the main side of the other wall element. Ideally, the end side is aligned, or at least more or less aligned, with the main side, i.e. with a possibly just very slight offset in relation to the main side. In the case of an offset, the extent of the offset can correspond approximately to the thickness of the adjustment adapter. The offset can provide stop portions or serve as a positioning aid for fitting the adjustment adapter correctly on the wall elements, and therefore a precisely correct fitting position of the adjustment adapter is easily possible and/or incorrect positioning can be ruled out.

The end side should be understood, in particular, as a front or rear narrow side of an elongate narrow side-wall element, front or rear being seen in relation to the drawer in each case. A main side may be an essentially sheet-like side or a planar side or the main side is open or profiled with mutually offset portions, which then form a side which is not closed over its surface area. In particular an outer side of a rear wall of the drawer is a possible main side. However, the situation where the main side is a front-wall-element outer side, which is directed forward toward an operating side of the drawer, is not ruled out. It is possible here for the adjustment adapter to be recessed, for example, in a set-back region or to be attached in a flush state in relation to adjoining regions, and therefore advantageously the outer side thereof does not project beyond adjacent portions of a front end side of the connected side-wall element.

Another essential aspect of the invention can be seen in a connecting adapter being provided for the connection of the wall elements which are to be connected, wherein the connecting adapter has an adjustment mechanism by means of which it is possible to adjust the position of the drawer relative to a guide unit in the state in which the drawer is accommodated on a basic structure in a movable manner via the guide unit. It is thus possible for the connecting adapter, in addition to the connecting function, to perform an additional function. This is because it is advantageously possible for an adjustment mechanism to be integrated with a component which is necessary in any case for assembling drawers or with the connecting adapter. The adjustment adapter, which performs both connecting tasks and the adjusting function, advantageously makes it possible to dispense with a further part with an adjusting function. This reduces the number of components and facilitates assembly.

Adjustment of the drawer relative to the guide unit may be important, for example, on account of a desired appearance of the piece of furniture with the drawer and/or for the running properties of the drawer. The drawer can be adjusted relative to the guide unit, for example, by a few millimeters and/or through a few angular degrees.

It is further proposed for the connecting adapter to be designed for connecting wall elements consisting of profile material. In the case of modern furniture parts or drawers, it is possible for wall elements to consist of a profiled material, for example of a metal material or plastics material. In relation, for example, to walls made of wood, profiled walls are partially or essentially hollow or provided with material cutouts. The connecting adapter proposed is advantageously suitable for connecting wall elements which consist of a profile material. This is because the connecting adapter is coordinated with the profiles, so that the connecting adapter can provide a mechanically stable and variable connection between wall elements which are to be connected to one another. In particular, the connecting adapter is coordinated with the profile such that reliable anchoring of the connecting adapter to counterpart portions or anchoring portions on the wall profile is always possible, for example, by way of engagement means such as screws for fixing the connecting adapter or for connecting the wall elements which are to be connected. In particular, the situation where the engagement means are introduced at locations which are not suitable for this purpose, for example, they are not retained sufficiently in a hollow portion of the profile and/or engage at least partially into space, in which case a sufficiently stable connection is not established, is avoided.

The connecting adapter is advantageously designed for connecting the wall elements in a drawer corner region formed by the wall elements which are to be connected. Wall elements which are to be connected can be connected particularly advantageously in a corner region of the drawer. This is because, there, the two wall elements which are to be connected come together or come into contact with one another or are spaced apart from one another only to a small extent. The connecting adapter is preferably designed such that it can absorb or channel away forces which occur, and can act in different directions. It is possible for such moments and forces acting in different directions, in particular on account of the wall elements running toward one another in the corner region, to be advantageously absorbed by the connecting adapter fitted there and for the connection of the wall elements to be established in a particularly reliable and stable manner. The connecting adapter can extend, for example, over the entire height of the end side of a side wall and, over a corresponding dimension, over a part of the width of the main side of a rear wall.

It is further advantageous if the engagement means are accommodated on the connecting adapter in a shiftable manner in order for it to be possible to fix the connecting adapter in different fitting positions on the wall elements which are to be connected. The engagement means, for example screw means, anchor the connecting adapter on the respective wall elements, that is to say give rise to a fixed connection on the end side of the one wall element and on the main-surface side of the other wall element. The engagement means may be designed, for example, such that they can be displaced or shifted relative to the connecting adapter, in particular they can engage through an opening in the connecting adapter. The engagement means can thus be anchored in the corresponding wall elements and give rise to a clamping action, wherein the connecting adapter, prior to being clamped firmly, can be adjusted in its position relative to the wall elements so that, fixed in a desired fitting position via the engagement means, it can be pressed against the corresponding portions of the wall elements which are to be connected.

An advantageous modification of the subject matter of the present invention is distinguished in that the engagement means comprise plug-on means for loosely retaining the connecting adapter on counterpart portions of the wall elements which are to be connected. The plug-on means are present, in particular, in a fixed position on the connecting adapter, for example possibly in a state in which they are integral therewith. It is thus possible for a connecting adapter, even in a position in which it is not yet screwed-tight or connected, to be pre-fixed, and retained, on the wall elements. All that is required at a later stage, for actual connection, is for the connecting adapter to be shifted to a small extent and moved into the precise position. It is possible for the connecting adapter, even prior to the wall elements being assembled, to be arranged, in particular, in captive and protected fashion on the counterpart portion, for example an anchoring portion of the wall element. It is particularly advantageous if the plug-on means allow the connecting adapter to be displaced along the counterpart portions.

It is also advantageous if the connecting adapter is configured as a separate part with a basic body and an actuator, which can be moved linearly thereon and belongs to the adjustment mechanism. The connecting adapter is thus of space-saving and straightforward configuration.

It is further advantageous if the actuator can be rotatably adjusted by actuation of a movably mounted actuating element, in particular by tool-free and/or manual actuation. It is thus possible at any time, by acting on the actuating element, for the actuator to be moved into a desired position and thus for adjustment of the position of the drawer relative to the guide unit to take place when the drawer is connected to the guide unit. In particular the relative position can be adjusted in a stepless manner or in very small intervals.

It is further advantageous here to have present a self-locking mechanism for securing an adjusted position of the actuator. This means that a selected adjustment position is always maintained even in the case of vibrations occurring as a result of the drawer moving.

It is further proposed for the adjustment mechanism to have an eccentric arrangement by means of which different adjustment positions of the adjustment mechanism can be established. An eccentric arrangement is a comparatively stable and space-saving arrangement for realizing an adjustment mechanism.

It is further proposed for a prepared anchoring portion with an engagement portion, in which the engagement means can be anchored, to be present in each case on the wall elements which are to be connected, wherein, with the wall elements oriented correctly for connection, the engagement portions extend in a common direction. It is thus possible for the engagement means to be introduced quickly and easily, for example, by a fitter, for example for all the engagement means to be introduced from one side.

The invention also relates to a drawer having a wall made of interconnected wall elements, wherein the drawer wall comprises a front wall, a rear wall and/or at least one side wall. One of the devices described is advantageously provided. It is thus possible to realize the aforementioned advantages on a drawer.

The wall elements are preferably connected to one another by virtue of an end side of one wall element butting flush against a main side of an adjacent wall element. The drawer is thus easy to assemble.

BRIEF DESCRIPTION OF THE DRAWINGS

Further advantages and features of the invention will be explained in more detail with reference to an exemplary embodiment according to the invention.

DETAILED DESCRIPTION OF THE INVENTION

A connecting adapter according to the invention designed as an adjustment adapter 1 serves for connecting a side wall 18 to a rear wall 19 of a drawer.

Figure 1:
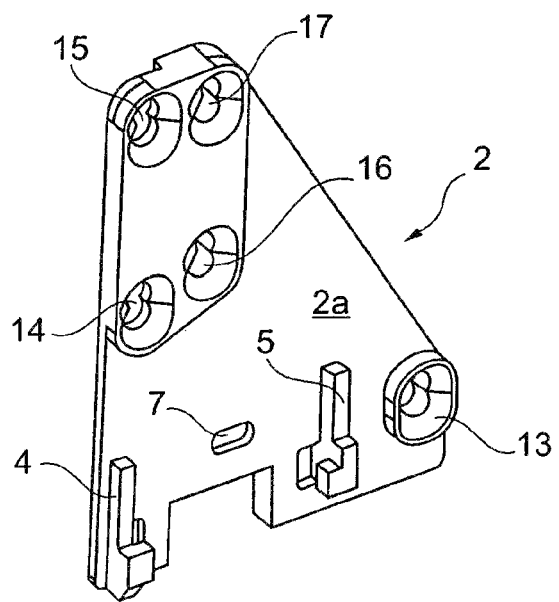
FIG. 1 shows a perspective front view of a base plate of a connecting adapter according to the invention.
Figure 2:
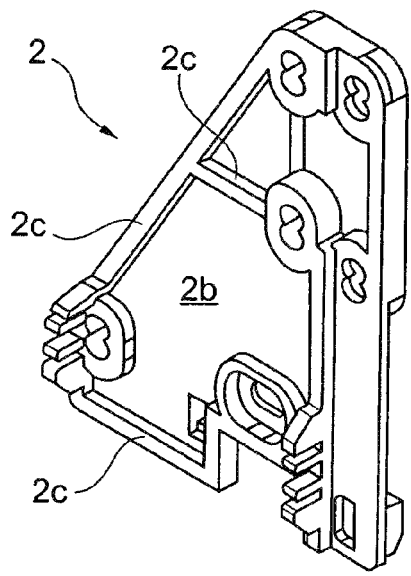
FIG. 2 shows a rear view of the connecting adapter from FIG. 1.
Figure 3:
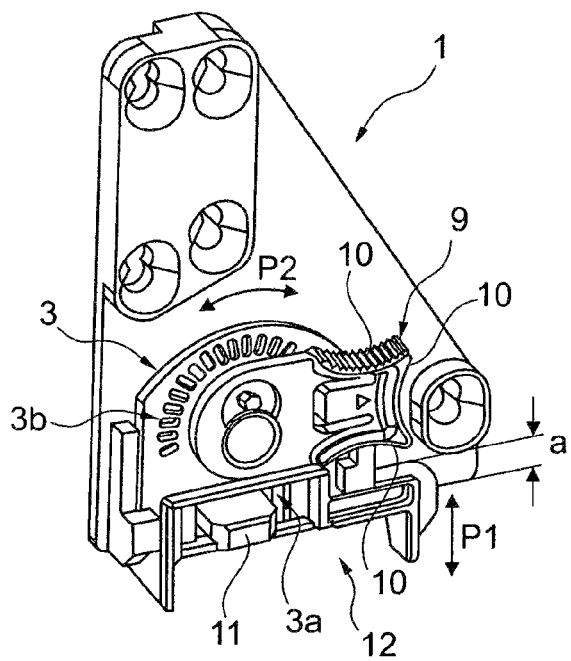
FIG. 3 shows a perspective front view of the base plate according to FIGS. 1 and 2 with an actuator arranged thereon.
Figure 4:
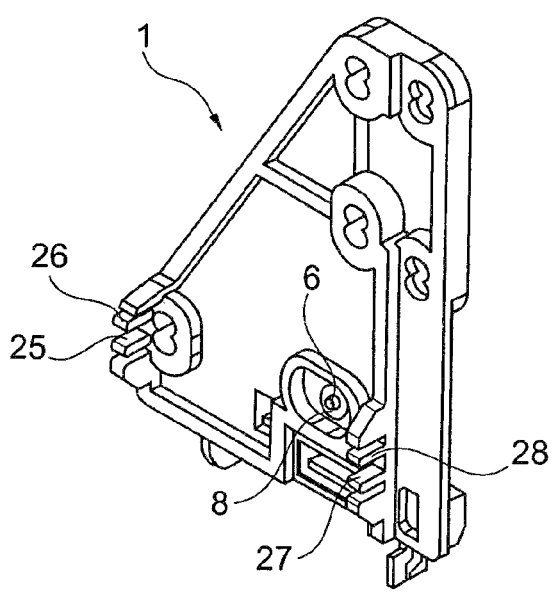
FIG. 4 shows a rear view of the arrangement according to FIG. 3.

FIGS. 3 and 4 show perspective front and rear views solely of the adjustment adapter 1. The adjustment adapter 1, here consisting of plastics material, comprises a base plate 2 (cf. FIGS. 1 and 2) with a front side 2*a* and a rear side 2*b*, which, with the adjustment adapter 1 in the fitted state, is directed toward the wall elements 18, 19 which are to be connected. The rear side 2*b* of the adjustment adapter 1 is provided, for lightweight construction and/or for stiffening purposes, with abutment crosspieces 2*c*, which are present along the peripheries and are guided inward in some places.

On the front side 2*a* of the base plate 2, an adjustment part 3 is accommodated in a displaceable manner, for example for displacement by the extent a or by a few millimeters, in this case by about 5 millimeters in accordance with double arrow P1 (FIG. 3), the adjustment part serving to adjust a position of a drawer relative to a guide unit (not shown), via which the drawer can be fastened on a basic furniture structure.

In order for the adjustment part 3 to be fitted correctly, and retained, on the base plate 2, the latter has, provided on its front side, two accommodating crosspieces 4 and 5, between which the adjustment part 3 is fixed in the lateral direction and can be displaced transversely thereto and upward and downward relative to the base plate 2 in accordance with the double arrow P1. On the adjustment adapter 1, a pin 6 of the adjustment part 3 engages through a slot 7 in the base plate 2. The pin 6 is secured on the rear side 2*b*, via a locking washer 8, against slipping out of the slot 7. Via the pin 6, an adjustment lever 9 is mounted on the base plate 2 such that it can be rotated eccentrically through 180 degrees. The adjustment lever 9 has a ribbed gripping contour 10 with three curved portions for manual operation of the adjustment lever 9, and therefore the adjustment lever 9 can be pivoted in relation to the base plate 2 in accordance with the double arrow P2 (FIG. 3). The pivoting movement is coupled to an adjustment of the adjustment part 3 in accordance with the double arrow P1, which takes place with the displacement of the pin 6 along the slot 7. FIG. 3 shows the adjustment part 3 in the position in which it has been displaced upward as far as possible.

A bearing support 11 and, above it, an opening 3*a* are present on the adjustment part 3, it being possible for a bent-over retaining nose at a rear end of a movement rail of the guide unit (not illustrated) to engage in the opening in order to connect the movement rail on the drawer. If the adjustment part 3 is displaced, for example, downward, by virtue of the adjustment lever 9 being pivoted in the counterclockwise direction out of the position shown, it is possible for the relevant drawer to be raised relative to the movement rail. The movement rail here has a downwardly open U-shaped groove of a mount 12 at the bottom of the adjustment part 3 engaging over it at the top and laterally in each case.

In order to secure the adjustment lever 9 or the adjustment part 3 in an adjusted position, a somewhat resiliently movable latching nose (not visible) on the adjustment lever 9 engages in one of a plurality of identical spaced-apart latching-in depressions of a latching profile 3*b* on the adjustment part 3.

In order to fix the base plate 2 or the adjustment adapter 1 on the wall elements which are to be connected, double holes 13 to 17 are provided on the adjustment adapter 1. Engagement or fixing means, not illustrated in FIGS. 1 to 4, for example screws, can be guided through the double holes 13 to 17 from the front side 2*a* and anchored in the wall elements. The double holes 13 to 17 each allow two plug-in positions for the engagement means, these positions being offset slightly in the direction of a heightwise dimension of the wall elements.

Figure 5:
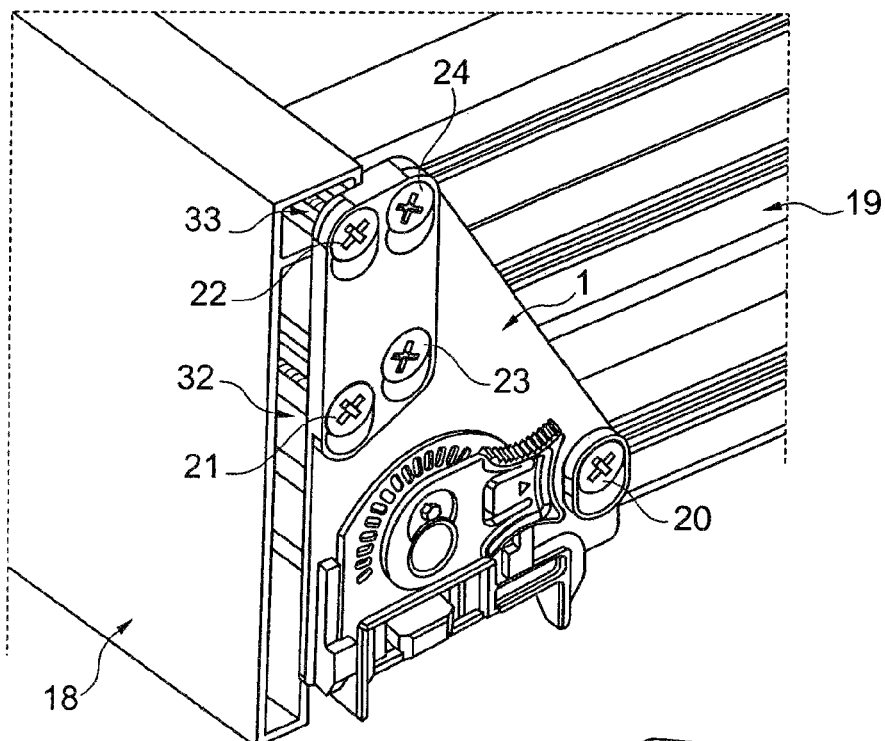
FIG. 5 shows a perspective partial view of a corner region of a drawer according to the invention, the corner region being connected via a connecting adapter according to the invention.
Figure 6:
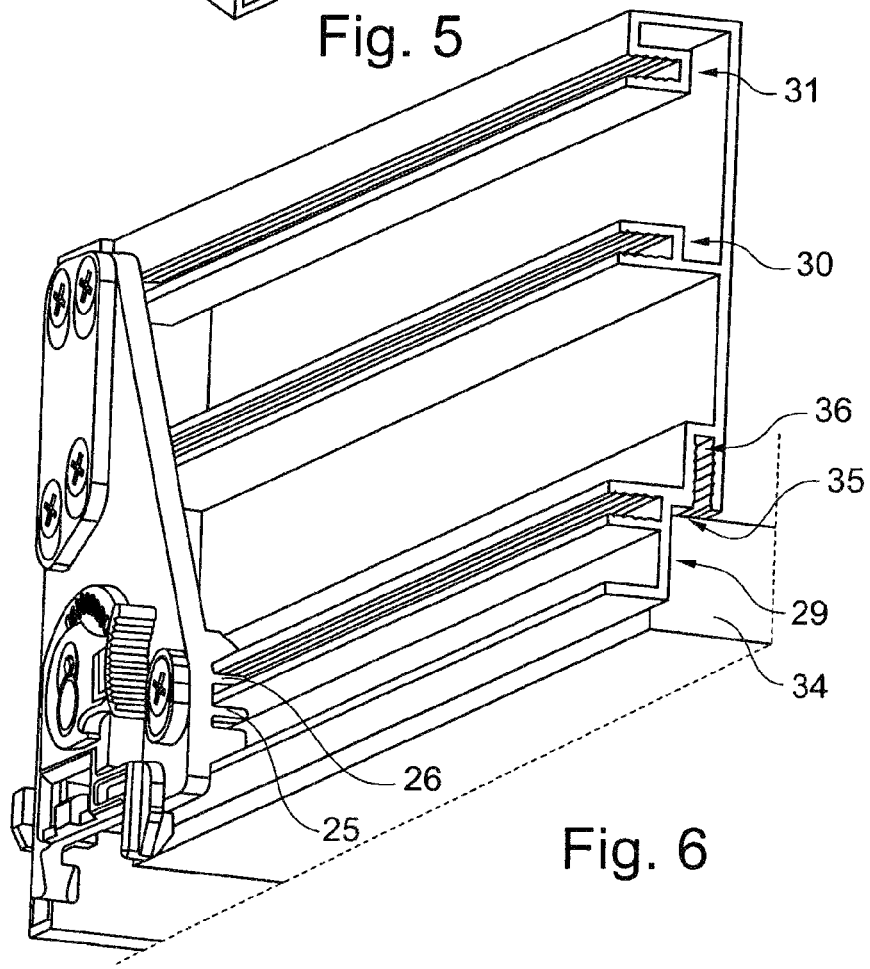
FIG. 6 shows a further perspective view of the arrangement according to FIG. 5.

FIGS. 5 and 6 show the adjustment adapter 1 according to FIGS. 3 and 4 in the connecting state, fitted on the side wall 18 and the rear wall 19. Also illustrated here are the engagement means, which comprise recessed-head screws 20 to 24 for fixing and connecting the wall elements 18 and 19.

The adjustment adapter 1, on the rear side 2*b*, also has fixed, projecting engagement means which are oriented perpendicularly to the rear side and have plug-in noses 25, 26 and 27, 28. Further engagement means above and beneath the plug-in noses 25 to 28 will not be explained in any more detail, but likewise serve for arranging the adjustment adapter 1 correctly on the wall elements which are to be connected or, in the example shown, on the wall element 19. The plug-in noses 25 to 28 engage in an anchoring portion 29 which is designed to match the plug-in noses 25 to 28 and extends in the longitudinal direction on the rear side of the rear wall 19.

Further anchoring portions 30 and 31 are located further up the rear side of the rear wall 19, and run along the rear wall 19 approximately centrally and at the upper periphery.

All the anchoring portions 29 to 31 have, over the entire width of the rear wall 19, at least one continuous or uninterrupted U-shaped groove and two parallel portions projecting in a crosspiece-like manner. The anchoring portion 29 comprises three crosspiece-like protrusions with a relatively narrow U-shaped groove with ribbing, which, in particular, is also suitable for allowing anchoring by virtue of a screw being screwed in, and with a further, wider U-shaped groove present therebeneath.

In the connected state according to FIGS. 5 and 6, the recessed-head screw 20 engages in the anchoring portion 29, the recessed-head screw 23 engages in the anchoring portion 30 and the recessed-head screw 24 engages in the anchoring portion 31 in the rear wall 19, in each case in a direction transverse to the longitudinal extent of the anchoring portions 29, 30 and 31.

The recessed-head screws 21 and 22 engage in corresponding anchoring portions 32 and 33 (FIG. 5) in the side wall 18, but in the direction of a longitudinal extent of the anchoring portions 32 and 33.

A base element 34 of the drawer is also provided, the base element butting against a right-angled shoulder 35 of the rear wall 19. Connecting elements or connecting screws for fixing the base element 34 on the rear wall 19 are not illustrated. Such fastening screws engage through the base element into a further anchoring portion 36 on the rear wall 19. The anchoring portion 36 is likewise designed as a U-shaped groove with two parallel crosspieces over the entire width of the rear wall 19. The U-shaped groove of the anchoring portion 36, however, is oriented differently to the anchoring portions 29 to 31, in this case being rotated downward through 90 degrees or being open in the downward direction.

LIST OF DESIGNATIONS

1 Adjustment adapter
2 Base plate

2a Front side
2b Rear side
2c Abutment crosspiece
3 Adjustment part
3a Opening
3b Latching profile
4 Accommodating crosspiece
5 Accommodating crosspiece
6 Pin
7 Slot
8 Locking washer
9 Adjustment lever
10 Engagement contour
11 Bearing support
12 Mount
13-17 Double hole
18 Side wall
19 Rear wall
20-24 Recessed-head screw
25,26 Plug-in nose
27,28 Plug-in nose
29-33 Anchoring portion
34 Base element
35 Shoulder
36 Anchoring portion

We claim:

1. A drawer wall element connecting device comprising:
a substantially plate shaped connecting adapter configured to connect drawer wall elements comprising:
a base plate comprising at least a front surface and an opposing back surface;
engagement means on the back surface of the base plate configured to connect the base plate to the drawer wall elements which are to be connected, the back surface of the base plate in a main direction of extent is configured to abut against and be directly connected to an end surface of a side drawer wall element and an outer main surface of one of a front wall and a rear wall of the drawer in a single plane; and
an adjustment mechanism attached to the front surface of the base plate so as to be fixed in a lateral direction and displaceable in at least one of a transverse direction and a vertical direction relative to the base plate of the substantially plate shaped connecting adapter;
wherein the adjustment mechanism further comprises a mount on a bottom portion of the adjustment mechanism that is configured to engage a movement rail; and
wherein the engagement means extend from the back surface of the base plate in a direction perpendicular to the main direction of extent of the back surface of the base plate.

2. The device according to claim 1, wherein the adjustment mechanism adjusts a position of the drawer relative to a guide unit in a state in which the drawer is accommodated on a basic structure in a movable manner via the guide unit.

3. The device as claimed in claim 1, wherein the substantially plate shaped connecting adapter is designed for connecting the drawer wall elements consisting of profile material.

4. The device as claimed in claim 1, wherein the substantially plate shaped connecting adapter is designed for connecting the drawer wall elements in a drawer corner region formed by the drawer wall elements which are to be connected.

5. The device as claimed in claim 1, wherein the engagement means are accommodated on the substantially plate shaped connecting adapter in a shiftable manner in order for it to be possible to fix the substantially plate shaped connecting adapter in different fitting positions on the drawer wall elements which are to be connected.

6. The device as claimed in claim 1, wherein the engagement means comprise plug-on means for loosely retaining the substantially plate shaped connecting adapter on counterpart portions of the drawer wall elements which are to be connected.

7. The device as claimed in claim 1, wherein the substantially plate shaped connecting adapter is configured as a separate part and the adjustment mechanism further comprises an actuator, which can be moved linearly on the base plate.

8. The device as claimed in claim 7, wherein the adjustment mechanism has an eccentric arrangement by means of which different adjustment positions of the adjustment mechanism can be established.

9. The device as claimed in claim 1, wherein the adjustment mechanism further comprises an actuator that is adjusted by manually actuating a movably mounted actuating element.

10. The device as claimed in claim 9, wherein manually actuating the movably mounted actuating element does not use any tools.

11. The device as claimed in claim 1, wherein the adjustment mechanism further comprises a self-locking mechanism for securing an adjusted position of the actuator.

12. The device as claimed in claim 1, wherein a prepared anchoring portion with an engagement portion, in which the engagement means can be anchored, is present in each case on the drawer wall elements which are to be connected, wherein, with the drawer wall elements oriented correctly for connection, the engagement portions extend in a common direction.

13. The device as claimed in claim 1, wherein the back surface of the base plate further comprises at least one abutment crosspiece that extends one of along an edge of the back surface and across a portion of the back surface of the base plate.

14. The device as claimed in claim 1, wherein the front surface of the base plate further comprises at least one accommodating crosspiece for attaching the adjustment mechanism to the base plate.

15. The device as claimed in claim 14, wherein the base plate further comprises a slot extending through the base plate that is positioned to enable a pin of the adjustment mechanism to pass through when the adjustment mechanism is attached to the at least one accommodating crosspiece, the pin being secured in the slot by a locking device on the back surface of the base plate to secure the adjustment mechanism to the front surface of the base plate.

16. The drawer wall element connecting device in claim 15, wherein the base plate further comprises a plurality of double holes at positions offset from one another to enable the connecting device to be adjusted in the vertical direction when connected to the wall elements.

17. The drawer wall element connecting device in claim 15, wherein the pin secured in the slot enables the connecting device to be adjustable in a horizontal direction when connected to the wall element.

18. The drawer wall element connecting device in claim 16, wherein each screw inserted into one of the plurality of double holes engages in an anchoring portion on one of the connected wall elements.

* * * * *